Jan. 12, 1954

R. BROWN 2,665,524

PROCESS AND APPARATUS FOR MAKING GLASS ARTICLES

Filed March 3, 1950

INVENTOR.
RALPH BROWN
By His ATTORNEYS
HARRIS, KIECH, FOSTER & HARRIS
By

Jan. 12, 1954

R. BROWN

2,665,524

PROCESS AND APPARATUS FOR MAKING GLASS ARTICLES

Filed March 3, 1950

INVENTOR.
RALPH BROWN
BY HIS ATTORNEYS
HARRIS KIECH, FOSTER & HARRIS

Patented Jan. 12, 1954

2,665,524

UNITED STATES PATENT OFFICE 2,665,524

PROCESS AND APPARATUS FOR MAKING GLASS ARTICLES

Ralph Brown, Fall Brook, Calif., assignor to Glass Labeling & Decorating Company, Los Angeles, Calif., a corporation of California Application March 3, 1950, Serial No. 147,535

26 Claims. (Cl. 49—1)

This invention relates to a method of and apparatus for producing glass articles, particularly relatively large glass articles of bowl-like character which are suitable for use as components of illuminated signs and as transparent or translucent lighting fixtures for encasing electrical illuminating tubes and lamps.

Since the advent of fluorescent illuminating means, there has been a recognized need for coverings of glass or other light-diffusing material by means of which the more or less unsightly tube light fixtures can be made to harmonize with their surroundings. Fluorescent lighting fixtures are made in various lengths, viz., 18" to 48", and occasionally longer, and pieces of glass suitable as coverings for the longer fixtures are not readily available for the purpose. While it is true that plastic materials, such as the methyl methacrylates, might be employed effectively for this purpose, the high cost of producing such molded plastic coverings prohibits their general use. A covering of bowl shape, composed of built-up sections or panels is also expensive to manufacture and, since a frame or other fastening means is required to assemble the panels, the covering is quite unattractive and cannot be made to conform to architectural and other requirements.

To obviate the use of more expensive materials, it has been proposed in the past to make glass articles of oblong and rectangular bowl and trough shapes by bending window and other flat glass. Due to the relatively hard nature of such flat glass, it is incapable of being distorted to any appreciable degree so that while the production of bowl-like articles of shallow depth is possible, the products have insufficient depth to completely encase fluorescent light tubes or illuminating lamps. Consequently, while such shallow, bowl-like glass coverings are inadequate, their use has been necessitated by the lack of more suitable coverings, and the need for a better product for the purpose is apparent.

In addition to the above, since the utilization of rectangular shapes of bent glass of shallow nature for the purpose explained above, there has been an increased demand for rectangular shapes of glass for residential and commercial lighting fixtures to be illuminated by incandescent means. Architects are requiring fixtures which harmonize concentrically with rectangular room shapes and ceiling panels, and which are not laden with decorations which heretofore have characterized so many lighting fixtures. While bent glass products have been used for this purpose, due to the fact that their depth is insufficient to encase the average incandescent bulbs, the same type of product as that needed for encasing fluorescent fixture installations is also becoming increasingly desirable for incandescent lighting fixtures.

At the present time the glass industry is divided into three main branches: the "flint" branch which specializes primarily in the making of pressed articles for many uses including tableware and blown ware for special purposes; the "bottle or container" branch which is devoted to making jars and bottles for package purposes, and such other uses as may require bottles; and the "flat" glass branch which is devoted almost entirely to the making of sheet glass.

Due to the nature of even the softest glass, it cannot be pressed into shapes of large diameter, for example over 12", except in heavy thicknesses. Blown rectangular ware, whether made in the "flint" or "container" branches of the industry by present equipment and techniques, requires that a round or semi-round "parison" or "ball" be used as a preform for subsequent blowing into a mold. When a round semi-viscous glass shape is placed in a rectangular mold and blown, the glass wall will not stretch after contact has been made with a mold surface and this results in thin corners which make such rectangular ware too fragile for ordinary use.

An unsuccessful attempt has been made in the past to produce relatively large bowl-like glass articles of the type discussed above by a rolling and molding process. This process consisted of ladling molten glass onto a table, after which a roll was caused to pass thereover to produce a sheet of glass of the desired color and thickness. This sheet was then transferred, by means of pincers and a large sheet metal paddle, to a position across the open top of a bowl-like mold. Due to the elapsed time between the rolling and placement of the glass sheet over the mold into which it was to be distorted to take the required shape, the glass became too cool and rigid to be deformed as desired, with the result that it was necessary to lower a firing hood upon or adjacent the glass sheet to soften the latter by reheating so as to permit it to be pulled, by gravity, into the mold cavity. This process, as developed and used, was slow and while it was adapted for producing large rectangular shapes, such as glass letters used in signs, it was primarily a laborious hand process. Consequently, the cost of producing the glass articles by this method was prohibitive and for this reason the process was discontinued.

It is an important object of the present invention to provide an improved method of producing relative large, bowl-like, glass articles inexpensively and rapidly, the invention further providing an apparatus for carrying out the method so that a minimum number of hand operations is necessary.

Another object is to provide a method of and means for mechanically producing articles of sizes and shapes not manufacturable by existing processes and equipment.

Another object is to provide a process of making large bowl-like glass articles wherein a sheet-like glass blank is first rolled and subsequently blown into a mold, instead of being pressed and blown as heretofore practiced, without reheating the preformed sheet.

Another object is to provide an apparatus which embodies means for rolling glass into sheets having varying thicknesses throughout their areas so that when the sheet is blown into a bowl-like mold, shapes are produced which have substantially uniform wall thicknesses.

Another object is to provide an apparatus which has a rolling table onto which molten glass is ladled or otherwise placed, means for rolling the molten glass into a sheet, a blowing table having a suitable mold, means for transferring the rolled sheet from the rolling table onto the blowing table across the cavity of the mold, means for shielding the glass sheet during such transfer so as to maintain the sheet at a temperature at which it can be blown and thus deformed into the mold cavity, and means operative, after the glass sheet has been disposed across the open top of the mold, to blow the glass thereinto to form the article. A further object in this respect is to provide an apparatus in which the rolling and blowing tables are pivoted on a common horizontal axis to adapt them to be pivoted individually and also together as a unit during certain steps of the complete operative cycle of the apparatus. By this provision, the glass material, which is placed on the horizontally disposed rolling table, is adapted to be rolled out thereon and to be thereafter covered and shielded by the blowing table which is pivoted to a position wherein it overlies the glass sheet, the blowing table having incorporated therein the mold into which the glass is to be blown. The rolling and blowing tables are pivotally movable as a unit to a horizontal position wherein the glass sheet is disposed across the cavity of the mold, after which the rolling table is adapted to be removed therefrom and replaced by a blowing head or hood which then operates to apply pneumatic pressure against the sheet to force the latter downwardly into the mold cavity, the blowing hood being retractable from this operative position following the blowing of the article to the required shape to permit removal of the article from the mold, the foregoing procedure constituting the novel process of this invention, and the arrangement of movable tables, as outlined briefly above, providing an important feature of the instant apparatus which effects the new and improved method.

Another object is to provide in an apparatus of the character referred to a blowing table which may carry molds of different shapes having a single cavity or a plurality of small cavities, depending upon the nature of the glass articles being produced. A related object is to provide a blowing head or hood, the perimeter of which is tapered to form, in effect, a knife edge capable of at least indenting the edges of the glass sheet which project laterally from the mold cavity or cavities. By this provision, the perimeter of the blow head is sealed by the molten glass and the score mark thus formed in the molded article facilitates removal of excess glass during a subsequent finishing operation.

Another object is to provide an apparatus of the type indicated which is capable of producing articles having raised and depressed portions, such as illuminated sign characters, the invention contemplating the use of a mold having interchangeable inserts for producing the desired character formation. Another object in this respect is to provide an apparatus which is adapted to form various ornamental designs in the finished article, the roller means for rolling out the sheet of raw glass prior to molding being so shaped that the desired design is embossed in the rolled sheet.

A further object is to provide an apparatus of the class specified which is preferably rotatably mounted so that the end of the apparatus which carries the glass rolling table can be moved to points adjacent the furnaces to receive molten glass of various types and colors in accordance with the requirements.

Another object is to provide an apparatus of the type indicated in which the rolling means is adjustable so that the thickness of the glass sheet can be varied in accordance with the requirements.

A further object is to provide an apparatus which is semiautomatic in operation, the various steps, with the exception of rolling the raw glass into a sheet, being performed automatically by electrical and hydraulic means, the operation of which is controlled by a single manually operable hand lever.

A still further object is to provide an apparatus which is relatively simple in construction, economical to produce and highly efficient in performing its intended function.

Further objects will appear from the following specification and from the drawings, which are intended for the purpose of illustration only, and in which.

Figure 1:
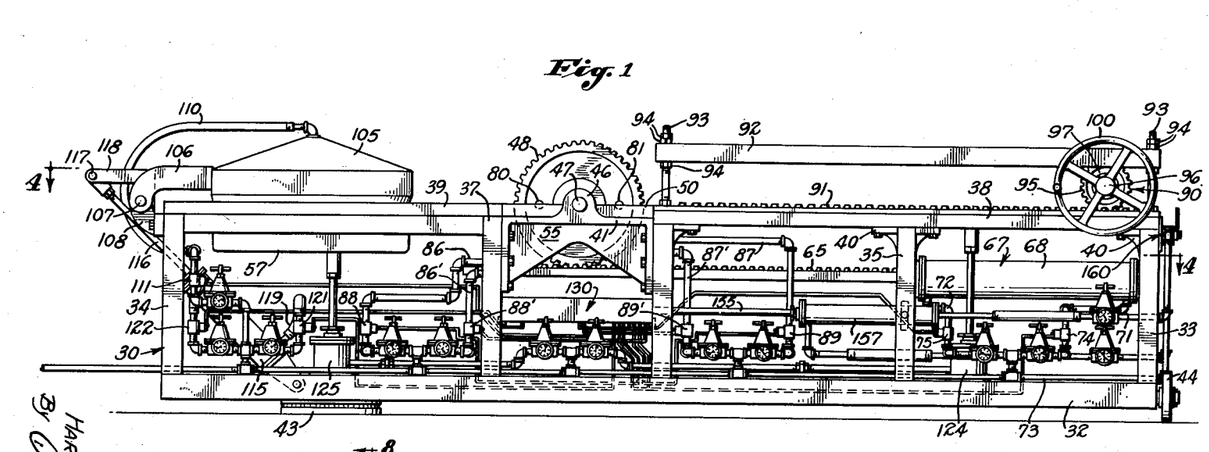
Fig. 1 is a front elevational view of the apparatus employed for carrying out the new process of making large, bowl-like, glass articles, the electrical and hydraulic means for operating the various parts being illustrated in this view.
Figure 5:
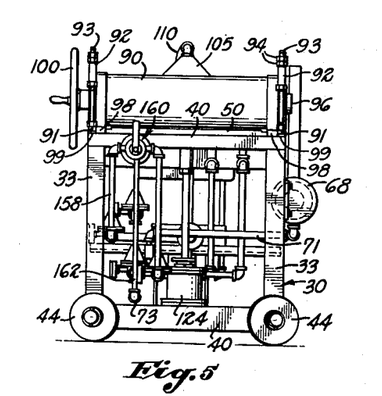
Figs. 5 and 6 are end elevations of the apparatus as viewed respectively from the right and left-hand ends of Fig. 1.

Referring to the drawings in detail, the present apparatus for producing glass articles includes a relatively long, rectangular frame 30 having lower longitudinal rails 31 and 32 which carry upright posts or stanchions 33 and 34 at their opposite ends and intermediate stanchions 35, 36 and 37. An upper pair of longitudinal bars or beams 38 is connected to the uprights 33, 35 and 36. Another pair of beams 39 is connected to the uprights 37 and 34. Cross-struts 40 are connected between the side members of the frame and intermediate supports 41 are joined between the uprights 35 and 36 to complete the frame. As shown in Fig. 1, the frame 30 is provided adjacent one end with an anti-friction bearing 43 by which this end is supported on a floor. The other end of the frame carries a pair of rollers 44 (Figs. 1 and 5) which are disposed radially with respect to the axis of the bearing 43 and adapted to roll along the floor to enable the entire apparatus to rotate in a horizontal plane about the axis of the bearing for the purpose to be later explained.

Figures 2, 10, 11, 12:
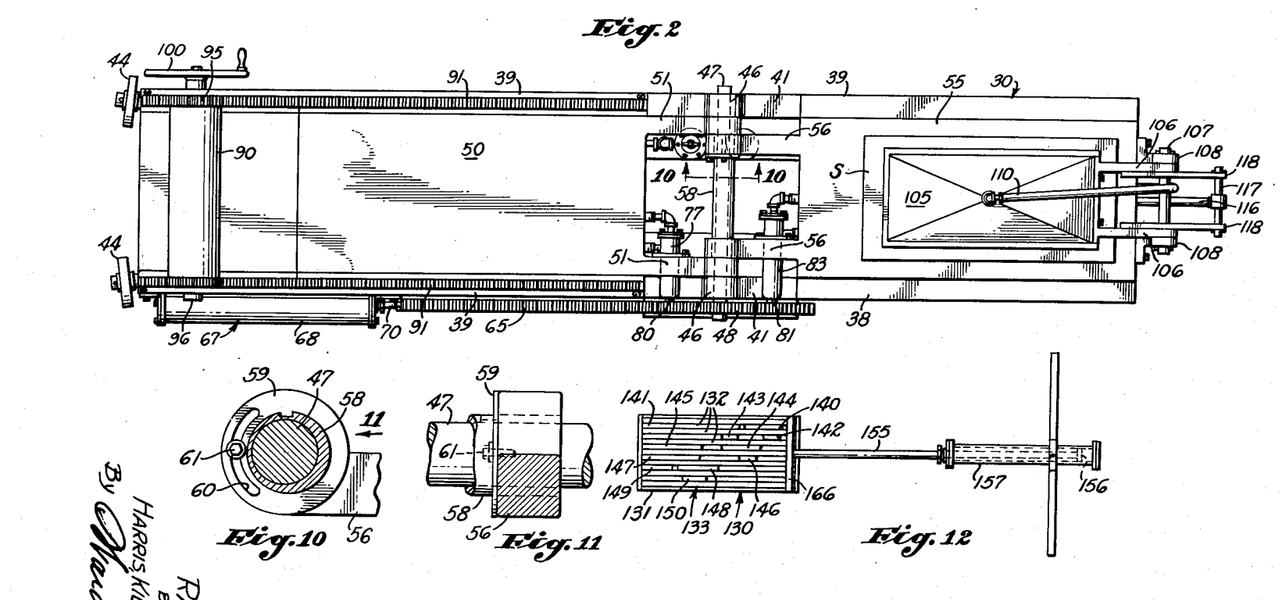
Fig. 2 is a plan view of the apparatus.
Fig. 10 is a cross-sectional view of the table pivot means, taken on line 10—10 of Fig. 2.
Fig. 11 is a side view of the pivot means as seen in the direction of arrow 11 in Fig. 10.
Fig. 12 is a plan view of the electrical control means or timer and the hydraulic means for operating the same.

The laterally spaced supports 41 are provided with pillow block bearings 46 in which the ends of a transverse pivot shaft 47 are rotatably mounted, the shaft projecting laterally beyond one side of the frame 30 and carrying a gear 48. A rolling table 50 has spaced arms 51 which are pivotally connected to the shaft 47, this table normally assuming the horizontal position shown in the drawings and serving as a plane surface upon which molten glass is rolled into a flat sheet for further processing. A second table 55, hereinafter referred to as the molding or blowing table, also has arms 56 which are pivotally mounted on the shaft 47, this table normally extending horizontally from the pivot shaft and in the opposite direction from the table 50. The pivoted table 55 carries a suitable mold 57 (Fig. 9) into which a sheet of molten glass can be blown to produce a molded glass article in the manner to be later explained. As shown in Figs. 2, 10 and 11, the table 55 is pivoted on a sleeve 58 which surrounds the shaft 47 and which has an eccentric bore. The sleeve 58 has a flange 59 provided with an arcuate opening 60 through which a clamping screw 61 extends and is screwed into the side of one arm 56 of the table 55. By this means, the screw 61 can be loosened and the sleeve 58 turned on the shaft 47 to initially adjust the table 55 so as to maintain it in parallel relation to the rolling table 50 when the tables are disposed, one over the other. By this means, glass sheets of different thicknesses may be retained between the tables during transferring of the sheet from a rolling to a blowing position.

Figure 3:
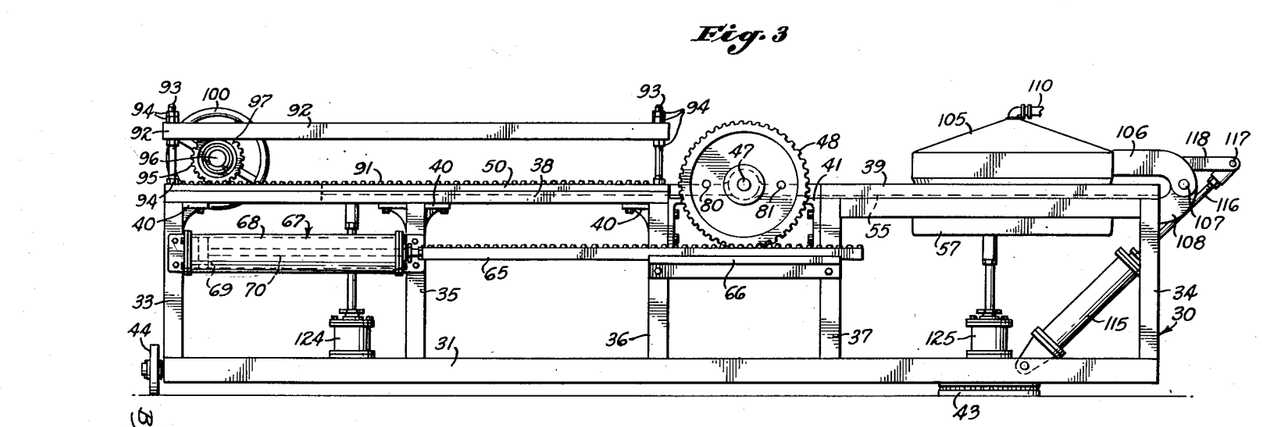
Fig. 3 is a rear elevational view of the same, the electrical and hydraulic means being omitted for the sake of clarity.
Figures 4, 14, 15:
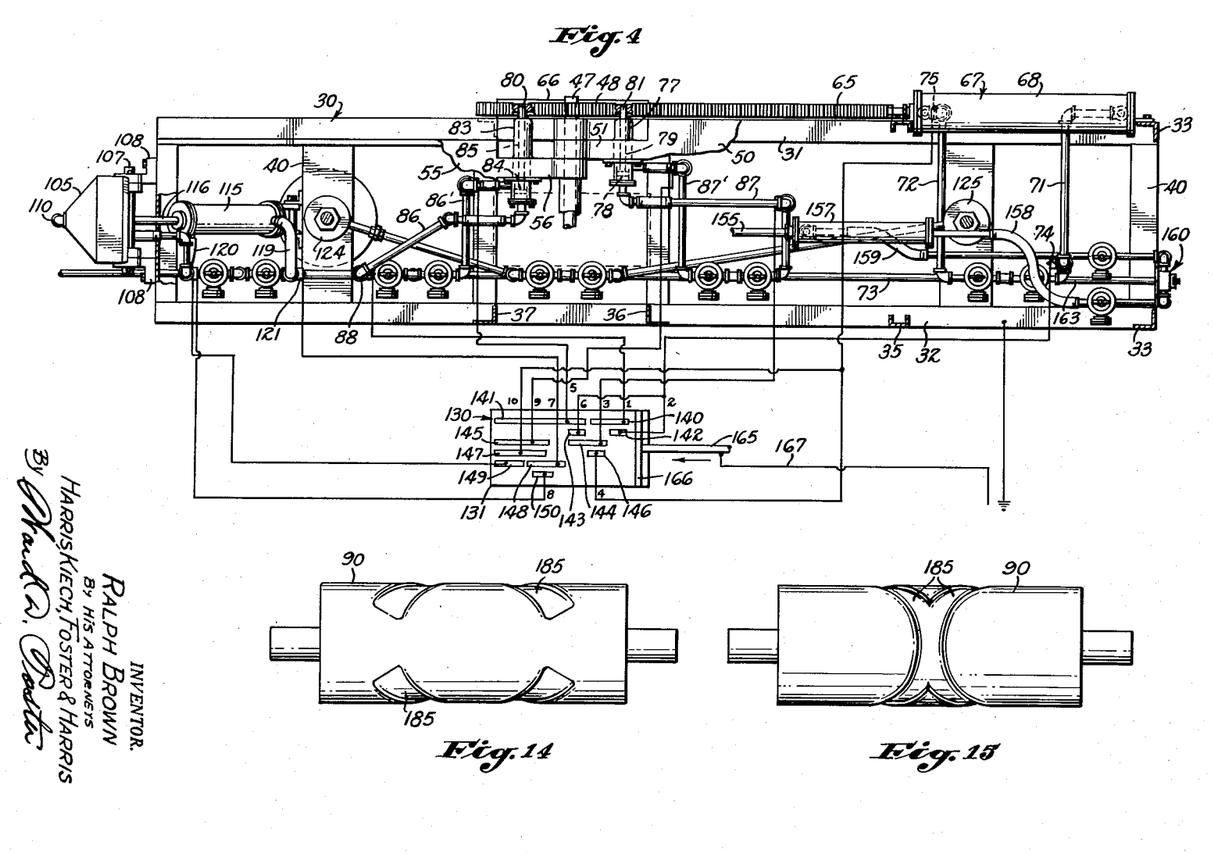
Fig. 4 is a fragmentary sectional plan view, taken substantially on line 4—4 of Fig. 1, the electrical control means being illustrated diagrammatically.
Fig. 14 is a side view of one form of glass sheet forming roller.
Fig. 15 is a view of said roller as observed from the opposite side thereof.

The tables 50 and 55 are adapted to pivot on the common axis 47, both independently and together, through substantially 180° during certain portions of the complete cycle of operation. As shown in Figs. 3 and 4, the apparatus includes a relatively long gear rack 65 which is slidable longitudinally along a side of the frame 30 in a guide bracket 66. The teeth of the rack 65 mesh with those of the gear 48 so that when the rack is slid longitudinally the gear is rotated thereby. The rack 65 is moved longitudinally by means of a fluid-actuated means 67 which includes a cylinder 68 secured against the side of the frame 30 and a piston 69 slidable in the cylinder, the piston having a rod 70 connected to an end of the rack (Fig. 3). As shown in Figs. 1 and 4, operating fluid is supplied to the opposite ends of the cylinder 68 through lines 71 and 72 which are connected to a main fluid line 73, the latter being connected to any suitable source of pressure fluid. The pressure fluid line 71 has a solenoid-actuated valve 74 and the line 72 has a similar valve 75, the solenoids of these valves being energized in sequence by control means to be later described.

The tables 50 and 55 are connected to be pivoted to either of their horizontal positions by fluid-actuated means to be next described. Referring to Figs. 1 to 4, one arm 51 of the table 50 carries a cylinder 77 in which a piston 78 is slidable. The piston 78 has a projecting rod 79 which is adapted to engage in one of a pair of apertures 80 and 81 provided in the gear 48 when the piston is slid in one direction in response to operating fluid introduced into the inner end of the cylinder 77. An arm 56 of the table 55 carries a similar cylinder 83, a piston 84 and a rod 85, the outer end of which is adapted to engage in the other of the apertures 80 and 81 when fluid is injected into the inner end of the cylinder, as later described.

Fluid is introduced into the opposite ends of the cylinders 77 and 83 through lines 86, 86' and 87, 87' which have flexible portions and which are connected to the main pressure fluid line 73. Included in the lines 86, 86' and 87, 87' are solenoid-actuated valves 88, 88' and 89, 89' respectively (Figs. 1 and 4). The solenoids of the valves are energized in the proper sequence by the electric control means to be later described.

As previously explained, the table 50 serves as a support upon which molten glass can be rolled to form a sheet thereof. The glass may be ladled onto the table 50 from one or more glass-melting furnaces and the apparatus turned on its pivot means 43 to bring the table adjacent the appropriate furnaces. After the molten glass has been placed on the table 50 it is rolled out to provide a sheet by means of a roller 90 extending transversely of the frame 30 above the table. As shown in Figs. 1, 2 and 3, the rails 38 of the frame 30 carry longitudinally extending gear racks 91. Extending parallel to and disposed above the racks 91 are bars 92, the ends of which are supported by bolts or studs 93 and nuts 94. The roller 90 has gears 95 adjacent its ends which mesh with the racks 91 so that when the shaft 96 of the roller is rotated the gears roll along the racks to effect rotation and travel of the roller longitudinally along the frame 30 so as to roll the glass on the table 50 to form a sheet, which is subsequently blown into the mold 57. During this movement of the roller 90 bearings 97 on the shaft roll along the under sides of the bars 92 which serve to guide the roller and retain its gears 95 in mesh with the racks 91. In order to adapt the roller means to roll out glass sheets of different thicknesses, the gear racks 91 and hold-down bars 92 are raised and lowered by means of shims 98 of desired thickness placed beneath the racks. Metal strips 99 of the desired glass thickness are disposed along the side edges of the rolling table, these strips providing means for directly supporting the roller 90 so as to avoid utilizing the gears 95 and racks 91 for this purpose. A handwheel 100 keyed to the shaft 96 facilitates manual rotation of the roller 90.

At the start of an article forming operation, the roller 90 is located at the right-hand end of the apparatus, as viewed in Fig. 1, and the rolling table is in position between the racks 91 in readiness to receive the molten glass. Before the glass is poured onto the table, the roller 90 is moved inwardly toward the shaft 47, and following the placing of the glass on the table the roller is moved outwardly to cause it to roll the glass into a sheet of the required thickness. Subsequently, the blowing table 55 is pivoted through 180° to cause it to lie upon the viscous glass sheet. Both plates 50 and 55 are then pivoted to a position adjacent the left-hand end of the apparatus (Fig. 1) so that the plates are inverted, that is, with the rolling plate 50 overlying the molding or blowing plate 55 and the sheet of glass disposed across the open upper side of the mold 57. Thus, the sheet of glass is transferred to a molding position and is, in effect, clamped between the two plates 50 and 55 during this transfer and the sheet is fully protected to minimize cooling thereof.

Figures 8, 9:
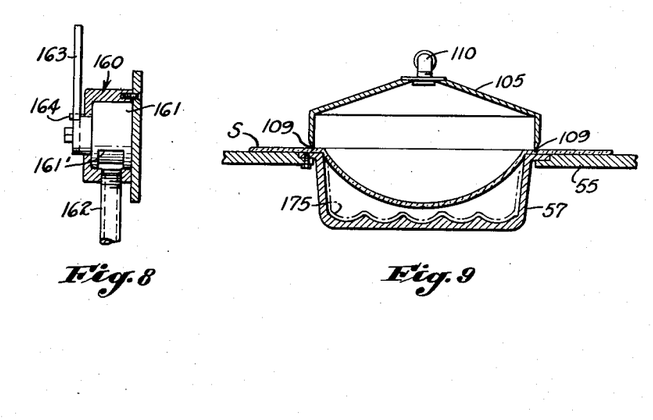
Fig. 8 is a vertical sectional view, taken on line 8—8 of Fig. 7.
Fig. 9 is a longitudinal sectional view through the mold and the blow-head, showing the glass sheet being blown into the cavity of the mold to form the bowl-like article.

After the sheet has thus been positioned for molding, the rolling table 50 is returned to first position. At this time the now exposed sheet of glass is quickly and effectively covered by a blowing head 105 which is in the form of a dome-like hood (Figs. 1 and 9). The head 105 has arms 106 which are pivoted to a rod 107 held in brackets 108 and extending transversely of the frame 30. The lower rim of the hood 105 has a sharp edge 109 (Fig. 9) so that when the hood is lowered onto the glass sheet S this edge sinks into the glass, thus forming a score mark or indentation in the glass adjacent the rim of the mold 57. When the blow-head 105 is in position against the glass sheet S with its edges thus sealed, compressed air is introduced thereinto through a hose 110 to cause the sheet to be blown down into the mold as shown in Fig. 9. Referring to Fig. 1, the hose 110 is connected to the pressure fluid line 37 and a solenoid-actuated valve 111 controls the passage of fluid inot the hood 105.

Figure 6:
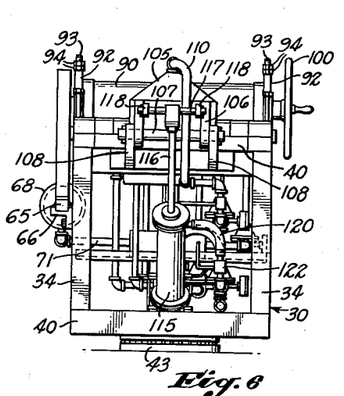

The blow-head 105 is pivoted to operative and inoperative positions by means of a fluid-actuated means which includes a cylinder 115 and a piston slidable in the cylinder and having a rod 116 which is pivotally connected to a pin 117 extending between arms 118 of the head (Figs. 2 and 3). Pressure fluid lines 119 and 120 are respectively connected to the lower and upper ends of the cylinder 115 and are joined to the main pressure fluid line 73, see Figs. 1 and 6. Flow of fluid through the line 119 is controlled by a solenoid-actuated valve 121 and flow thereof through the line 120 is responsive to operation of a solenoid-actuated valve 122. The solenoids of the valves 121 and 122 are energized in proper sequence by an electrical control means to be later described. Movement of the tables 50 and 55 to their horizontal positions is limited by suitable shock-absorber means 124 and 125.

Figure 13:
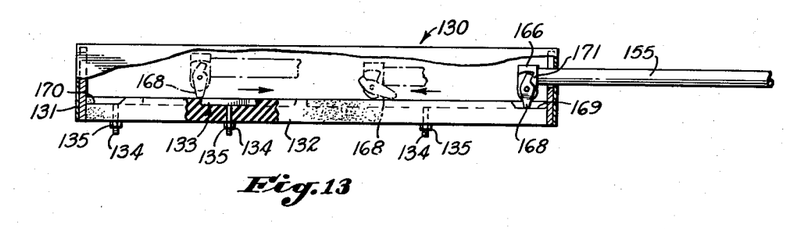
Fig. 13 is an enlarged side view of the electrical timer box and illustrating the manner in which the brush moves along the various contact bars.

The electrical control means for energizing the solenoids of the various valves in predetermined sequence is indicated generally at 130 in Fig. 1 and in detail in Figs. 4, 12 and 13 of the drawings. The control means 130 includes a stationary rectangular frame 131, the bottom of which is composed of a plurality of bars 132 of insulation material, the bars being suitably connected in side-by-side relation. Each bar 132 has one or more recesses in its upper face in which are disposed metal contact strips indicated generally at 133, these strips being retained in the recesses by bolts 134, carried by the strips and extending down through apertures in the bars, and nuts 135 which are screwed onto the lower projecting ends of the bolts (Fig. 13).

As shown in Figs. 4 and 12, one bar 132 has a pair of the contact strips which are designated 140 and 141; another bar has contact strips 142 and 143; another bar has strips 144 and 145; another bar has strips 146 and 147; another bar has strips 148 and 149; and the remaining bar has a single contact strip 150. The numerals 1 to 10 of Fig. 4 indicate the respective circuits controlled through these contact strips 140 to 150. The contact strips 140 to 150 are of different lengths and are disposed at different longitudinal positions in accordance with the desired sequence of operation of the various mechanisms of the apparatus. As shown in Fig. 4, the contact strips 140, 141, 142, 143, 144, 145, 146, 147, 148, 149 and 150 are electrically connected to the solenoids of the respective valves 88, 88', 74, 74, 89, 89', 75, 75, 121, 122 and 111. These valves may be any type commonly used and well known in the industries for exhausting fluid pressures at the conclusions of the respective operations.

Figure 7:
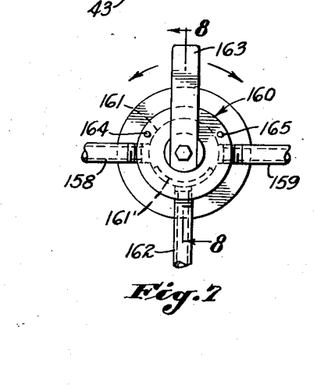
Fig. 7 is a side view of the manually operable selector valve for controlling the operation of the apparatus.

One end of the frame 131 is provided with a bearing groove through which the rod 155 of a piston 156 is slidable. The piston 156 is slidable in a cylinder 157 supported by and extending longitudinally of the frame 30 (Figs. 1 and 4). Connected to the opposite ends of the cylinder 157 are pressure fluid lines 158 and 159 which communicate with the interior of the housing of a valve 160 preferably located at the glass rolling end of the apparatus (Figs. 1, 4, 7 and 8). As shown in Figs. 7 and 8, the valve 160 includes a rotatable element 161 which has an arcuate groove or passage 161' extending through 90°. The passage 161' is adapted to register with the inner end of the fluid line 158 and the inner end of a pipe 162 which is connected to the main fluid line 73, and between the pipe 162 and line 159, depending upon the direction in which the element 161 is rotated by means of a handle 163, rotary movement of the element being limited by pins 164 and 165.

The end of the piston rod 155, which extends into the frame 131 of the control device 130, carries a transverse bar 166, hereinafter referred to as a brush. The brush 166 is adapted to move toward the left, as viewed in Figs. 4, 12 and 13, and to ride along the bars 132 in contact therewith when operating pressure fluid is introduced into outer or right-hand end of the cylinder 157 in response to opening of the valve 160 to cause the fluid to pass from the lines 73 and 163 through the line 158. When the valve element 161 is moved to effect fluid communication between the lines 163 and 159, the piston 156 is returned to outermost position so that the brush 166 is retracted to its initial position.

During movement of the brush 166 toward the left, the brush engages successively with the respective contact strips 140, 142, 144, 146, 141, 143, 148, 150, 145, 147 and 149 so as to effect flow of electricity from a power line 167, connected to the brush, to the valve solenoids which are electrically connected to the individual contact strips. The solenoids may be grounded in the frame 30 to complete the circuits and thus effect energization of the solenoids. The brush 166 carries a pivoted rider 168 at each end, the riders normally hanging loosely from the brush 166 into grooves 169 of the frame 131 before the start of the operative stroke of the brush toward the left, and during this stroke the riders simply ride along the tops of the sides of the frame. As the brush completes its movement toward the left, the riders 168 pivot downwardly by gravity into grooves 170, the upper ends of the riders engaging against lugs 171 on the brush. Consequently, when the movement of the brush 166 is reversed and the riders 168 move upwardly out of the grooves 170, the riders then act to raise the brush so that engagement of the brush with the contact strips 140 to 150 during the return stroke of the brush is prevented. When the brush 166 reaches its initial position, the riders 168 pivot into the grooves 169 so as to again lower the brush into position to engage the contact strips when it is again moved through an operative stroke.

Figure 16A:
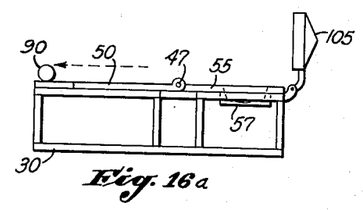
Figs. 16a to 16h are diagrammatical views of the apparatus, illustrating the sequential steps of the complete operation of the apparatus in forming a bowl-like glass article.

The apparatus having been described in detail, the mode of operation will next be explained, particular reference being made to the diagrammatical views 16a to 16h. Prior to performing an article producing operation, the various elements of the apparatus assume the positions shown in Fig. 16a. At this time, the rolling and blowing tables 50 and 55 extend horizontally from the pivot shaft 47 in opposite longitudinal directions and the blowing head 105 is in its raised, inoperative position, the valve actuator element 161 being in the central position shown in Fig. 7.

Figure 16B:
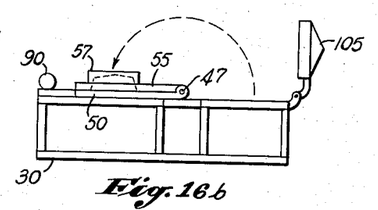
Figure 16C:
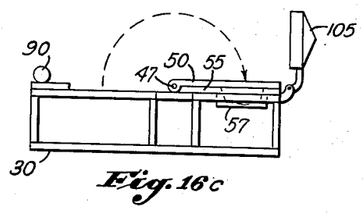
Figure 16D:
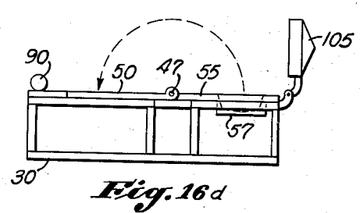
Figure 16E:
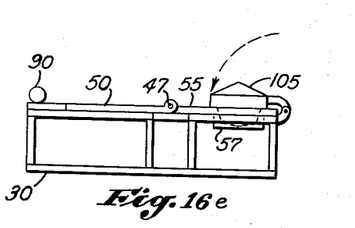
Figure 16F:
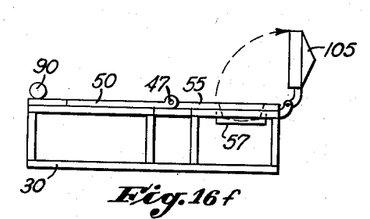
Figure 16G:
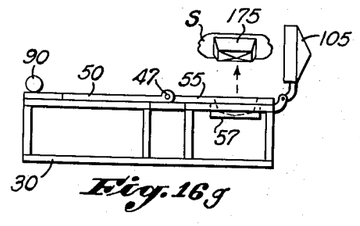
Figure 16H:
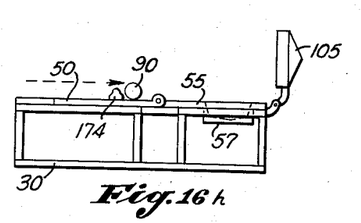

To produce a large, molded glass article of bowl-like character which is suitable for use as a covering for electric illuminating means, such as fluorescent tubes or incandescent lamps, the roller 90 is first moved inwardly to the position shown in Fig. 16h. The apparatus then may be rotated on its axis 43 to dispose the rolling table 50 adjacent a glass melting furnace. Molten glass is next ladled or otherwise transferred from the furnace to the table 50 so as to provide a charge or mass 174 of the glass thereon as shown in Fig. 16h. The operator then rotates the roller 90 by means of the handwheel 100 to cause the roller to travel outwardly from the position shown in Fig. 16h to that indicated in Fig. 16a so as to roll out the viscous glass into a sheet S of the desired thickness.

Following the forming of the glass sheet S, the operator assumes a position adjacent the right-hand end of the apparatus, as viewed in Figs. 1 and 4 and rotates the valve element 161 in clockwise direction to establish flow of pressure fluid from the main line 73, through the line 158, into the right-hand or outer end of the cylinder 157. By this action, the piston 156, rod 155 and brush 166 are forced toward the left through an operative stroke. As the brush 166 is thus moved, it first engages the contact strip 140 to energize the solenoid of the valve 88 so as to effect flow of the operating fluid into the inner end of the cylinder 77 and thus cause the end of the piston rod 79 to engage in the aperture 80 of the gear 48. The blowing or molding table 55 is thus fixedly connected to the gear 48 which is at this time stationary.

As the brush 166 of the control or timer device 130 continues its movement, it engages the contact strip 142 so as to cause energization of the solenoid of valve 74 to open the latter and thus admit pressure fluid into the outer end of the cylinder 68. By this action, the rack 65 is slid toward the left, as viewed in Figs. 1 and 4, and the gear 48 is thus rotated in clockwise direction to pivot the blowing table 55 across its pivot 47 and into position upon the rolling table 50 as shown in Fig. 16b. It is to be noted that when the table 55 is in this position the mold 57 thereof is disposed in inverted position, that is, with its open end directed downwardly against the sheet S of glass. As the table 55 completes its pivotal movement in this direction, the brush 166 rides off the contact strip 142 so that the valve 74 is closed.

Subsequently, the brush 166 contacts the strip 144 to energize the solenoid of the valve 89 to cause the latter to open and thus admit operating fluid into the inner end of the cylinder 83. The piston rod 85 is thus projected into the aperture 81 to connect the table 50 for rotation with the gear 48, the table 55 remaining connected to the gear. Shortly after this operation, the brush contacts the strip 146 so as to effect energization of the solenoid of the valve 75 to allow fluid to enter the inner end of the cylinder 68. By this action, the rack 65 is slid outwardly to cause the gear 48, and the tables 50 and 55 connected thereto, to rotate in counterclockwise direction, as viewed in Fig. 1. Consequently, the tables 50 and 55, together with the sheet S of glass, are pivoted as a unit from the rolling end to the blowing or molding end of the machine as shown in Fig. 16c. In this position of the tables 50 and 55, the glass sheet S overlies the open end of the cavity of the mold 57. It is important to note that during the transferring of the rolled, viscous sheet of glass from the rolling station to the blowing and molding station the sheet is fully shielded by the tables 50 and 55 so that cooling thereof is greatly minimized and the sheet remains in a viscous condition to adapt it to be subsequently blown.

Following the transferring of the sheet S to molding position the contact brush 166 of the control device 130 rides off from the contact strips 140 and 146 but remains in engagement with the strip 144. Consequently, the solenoid of the valve 88 is de-energized and this valve is thus closed while the valve 89 remains open. Shortly thereafter the brush 166 engages the contact strips 141 and 143 to effect opening of the valves 88' and 74. By this action, withdrawal of the piston rod 79 from the aperture 80 is effected so as to uncouple the table 55 from the gear 48. At the same time the rack 65 is slid inwardly to cause the gear 48 to rotate in clockwise direction (Fig. 1) so as to swing the table 50 back to its initial position at the sheet rolling end of the apparatus, as shown in Fig. 16d.

Eventually, the brush 166 rides off from the contact strips 143 and 144, remains in engagement with the strip 141, and engages the strip 148 so as to cause opening of the valve 121 which controls the flow of operating fluid into the lower end of the cylinder 115. Thus, the piston rod 116 is slid upwardly to pivot the blow head 105 downwardly against the sheet of glass as indicated in Figs. 9 and 16e. This action quickly follows the withdrawal of the table 50 from above the table 55 so that cooling of the glass sheet is negligible. The contact strip 150 is next engaged by the brush 166 so that the solenoid of the valve 111 is energized to admit pressure air into the dome-like blow head 105 by way of the hose 110.

When the sheet S of viscous glass, which at this time extends across the open upper end of the mold 57, is subjected to air pressure, it is blown down into the mold and caused to assume the contour of the mold cavity, as indicated by the dot-and-dash lines in Fig. 9. It is also within the concept of this invention to provide suction means operative to draw the viscous sheet downwardly into the mold 57, the invention broadly including any means for creating a pressure differential on the opposite sides of the glass sheet to deform the same into the mold cavity.

Figure 17:
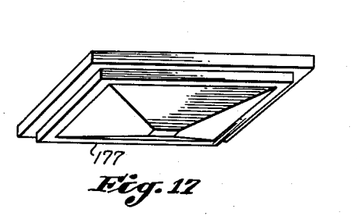
Figs. 17 to 21 illustrate various forms of glass articles which can be produced by means of the present apparatus.
Figure 18:
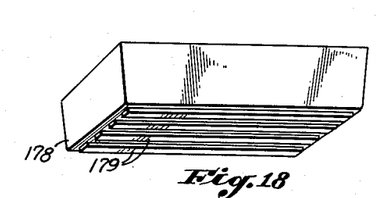
Figure 19:
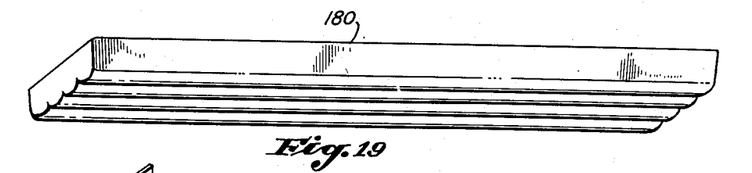
Figures 20, 21:
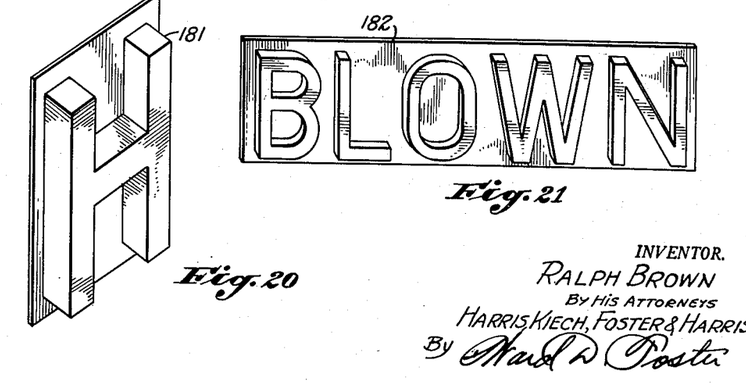
Figure 22:
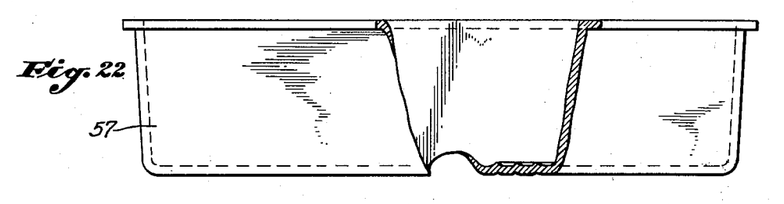
Fig. 22 illustrates a typical mold or form into which the glass is blown.

It has been explained that the present apparatus is particularly adapted for producing relatively large, molded, glass articles such as the bowl-like rectangular lighting fixture 180 shown in Fig. 19. Such articles may include a laterally projecting peripheral rim by which the article can be suspended from a ceiling to cover the fluorescent tubes or incandescent lamps of a lighting fixture. Such a covering is complete in itself, as distinguished from a built-up covering composed of a plurality of glass sections which are held in assembled relation by means of brackets or holders. Figs. 17 to 20 illustrate blown glass articles which may be produced in the present apparatus by merely employing molds having the necessary configurations. Fig. 17 shows a shield or covering 177 which is of stepped configuration and particularly adapted for use as a covering for incandescent lamps. The covering 178 illustrated in Fig. 18 is similar to those shown in Figs. 17 and 20 except that it has no peripheral flange and has external, ornamental ribs 179. The relatively long shallow covering 180 shown in Fig. 19 is another example of a long, shallow, bowl-like article which can be produced by the glass rolling and blowing mechanism of the apparatus. The present machine may also be utilized for producing illuminated sign character elements such as the single one shown in Fig. 20 and indicated by the reference numeral 181. In other instances, a plurality of the sign character elements may be simultaneously produced to form a word as shown at 182 in Fig. 21.

The size and contour of the article to be produced by the combined rolling and blowing of the glass are determined by the particular mold employed, it being apparent that the mold 57 may be replaced readily by other molds by simply removing the mold 57 and bolting another mold in its place within the opening in the molding table 55. In setting up the apparatus for producing a particular article, it may be necessary to substitute other blow heads for the blow head 105 to conform to the size and shape of the particular mold employed.

It has been explained that during the blowing of semi-viscous glass into a rectangular mold, the glass wall will not stretch to any appreciable extent after it has contacted a mold surface and this has heretofore resulted in the formation of thin corners, which make the rectangular ware too fragile for ordinary use. While it appears impossible to fully control the actual deformation of the sheet S of glass into the mold by methods heretofore employed, the present invention provides means whereby the glass sheet may be provided with relatively thick portions which are to ultimately form the corners of the article, so as to compensate for the inability of the glass sheet to follow the contour of the mold cavity with equal thickness throughout. It has been determined that a sheet of glass can be blown to a rectangular box-like shape with far less deformation or "thinning" at the corners than occurs when a box is blown from a ball of the glass.

The present invention further contemplates means for more positively controlling the thickness of the glass at the corners of the box-like blown article. Referring to Figs. 14 and 15, the roller 90, which is employed for rolling the sheet S on the table 50, may be provided with grooves or indentations 185 which, when the roller is moved along the table, act to roll out a sheet which has portions of increased thickness. These grooves are so positioned and formed that the portions of increased thickness are located at the areas necessary to make additional glass available at areas of the mold which require such increased amounts of the glass to produce an article having substantially uniform wall thickness throughout. By this provision, thin corners may be avoided and stronger, more durable articles produced. It has been determined that in most cases, substantially uniform wall thickness may be produced by employing a plain roller 90, rollers of the type shown in Figs. 14 and 15 being necessary only when glass containers of special shapes are to be produced and additional reinforcing of the corner portions of the articles is desired. It is further pointed out that the roll 90 may be so formed that figures and other ornamental decorations may be provided in the glass article to enhance the appearance thereof. Depending upon how a roll should be engraved, figures may be rolled, and will so "set" that the sheet upon which they are embossed may be blown without distorting the figures beyond a reasonable extent. Obviously, consideration of the distorting factor should be given at the time the rolls are engraved to provide ornamental characteristics. Such characteristic ornamentation is not now available to the industry due to the fact, previously mentioned, that any products of a type to be manufactured by this process, presently produced to a lesser extent of perfection by bending premanufactured glass sheets, are limited to such minor decorations as are to be found on commercial flat glass.

After the glass sheet S has been deformed into the mold 57 to form the desired article, the brush 166 of the electrical control mechanism 130 moves into engagement with the contact strip 145 so that the solenoid of the valve 89' is energized to cause operating fluid to enter the cylinder 83 to widthdrawn the piston 85 from the aperture 81 of the gear 48. Thus, both tables 50 and 55 are disconnected from the gear 48. Shortly thereafter, the brush 166 rides onto the contact strip 147 to energize the solenoid of the valve 75 so as to cause fluid to enter the inner end of the cylinder 68, this action effecting return of the rack 65 to initial position in readiness to commence another cycle of operation of the apparatus. When the brush 166 rides beyond the contact strip 150, the valve 111 closes to discontinue the supply of air into the blow head or dome 105.

At a later stage in the cycle, the brush 166 engages the contact strip 149 to energize the solenoid of the valve 122 so as to admit pressure fluid into the upper end of the cylinder 115 and thus cause upward pivotal movement of the blow head 105 to the inoperative position shown in Figs. 4 and 16f. Thus, the various mechanisms of the apparatus are restored to their initial inoperative positions. The operator then pivots the handle 163 of the valve 160 in counterclockwise direction (Fig. 7) to cause pressure fluid to flow through line 159 into the left-hand end of the cylinder 157 (Fig. 4) so as to return the contact brush 166 to its initial position as shown in the latter view.

After the main elements of the apparatus have been restored to their inoperative positions, the blown, molded glass article 175 can be removed from the mold 57 as indicated in Fig. 16g. This removal may be accomplished manually or by other suitable means, such as a fluid-actuated stripping mechanism, not shown. The article 175 will, of course, have a laterally projecting portion forming an extension of its flange 176. However, since this portion is joined to the flange 176 by a score line area, which is produced by the edge 109 of the blow head 105, it can be readily separated from the flange, after which the edge of the flange can be ground to finish the article. It is thus seen that except for a minimum number of simple manual operations, the apparatus is automatic in its operation of producing large, bowl-like, rectangular glass articles and that following the setting up of the machine for making a particular article, the apparatus can be operated continuously to produce the articles in large quantities in a minimum period of time. Consequently, not only is the machine capable of producing articles heretofore unobtainable by previous methods but it is capable of mass production so that the articles can be made at a relatively low cost.

As previously pointed out, the present invention is directed to an apparatus in which glass is first rolled to provide a sheet which is then blow into a mold to produce a large variety of glass articles. In this respect, it is to be noted that by the present process and apparatus there may be produced extremely large articles such as glass coffins and other receptacles, special windows, large bas-relief figures and various other glass objects not obtainable by previously known methods of manufacture. Production of glass objects by the method and apparatus of this invention is not limited to articles not previously made, or to articles of shapes and sizes previously unobtainable. It will be apparent that any article which can be blown from sheet glass can be made economically by the present method of manufacture, such items including, for example, cups, saucers, plates, jewel boxes, industrial articles, etc., so long as they can be blown in multiple from a single sheet of glass and subsequently cut apart and their edges finished. In some cases, the present apparatus, because of the large areas that can be blown at one time therein, may successfully mass produce articles at a lower cost than by existing apparatus which is incapable of handling such large sheets of glass.

I claim as my invention:

1. A method of producing a box-like glass article, including the steps of: rolling molten glass upon a supporting surface to provide a glass sheet; transferring said sheet in an inverted position to a surface having a mold cavity to lie across said cavity with such cavity below the inverted sheet; shielding the upper side of the inverted sheet and positively applying a pressure differential to the sides of said sheet for deforming the same downward into said cavity to assume the contour thereof; and thickening the rolled molten glass sheet in zones corresponding with the corners of the box-like article to be produced to provide substantially uniform thickness of the molded article throughout its sides and corners.

2. A method of producing a box-like article including the steps of: rolling molten glass upon a supporting surface to provide a glass sheet; shielding said sheet to maintain the latter in a substantially molten state; inverting said shielded sheet and its shield; providing a mold cavity below the inverted sheet; applying a pneumatic pressure differential to the sides of the sheet for deforming the same downward into said cavity to assume the contour thereof; and thickening the rolled molten glass sheet in zones corresponding with the corners of the article to be produced to provide substantially uniform thickness of the molded article at its sides and corners.

3. Apparatus for producing box-like articles, including: a supporting table to receive molten glass; means for rolling said molten glass on said supporting table to form a sheet; groove means disposed to provide extra glass thickness in the glass sheet in regions corresponding with the corners between adjacent walls of the glass article being formed; means mounting said supporting table to swing into an inverted position; a mold member having a mold cavity for contact with the rolled glass sheet with the mouth of said cavity directed toward said sheet and said sheet overlying said cavity upon inversion of said sheet and supporting table; and means for applying a pressure differential to the opposite sides of said sheet to cause said sheet to assume the contour of said mold cavity.

4. An apparatus for producing box-like glass articles, comprising: a frame; a rolling table movable on said frame to a first position to receive and support molten glass thereon; rolling means movable on said frame and operative to roll the molten glass to provide a sheet of said glass on said rolling table; a mold movable on said frame to a first position wherein it overlies the sheet of glass with its cavity disposed toward said sheet to shield the same and maintain it in its molten state, said table and said mold being movable as a unit from their said first position to a second position wherein said glass sheet overlies said mold cavity; operating means for moving said rolling table and said mold to their first and second positions, said operating means being operative to return said table from its said second position to its said first position so as to leave said glass sheet extending across said mold cavity; blowing means mounted on said frame and operative to blow said sheet into said cavity to cause it to assume the contour thereof; and control means for controlling said operating means so as to move said rolling table and said mold and actuate said blowing means in sequence.

5. An apparatus for producing box-like glass articles, comprising: a frame; a rolling table movable on said frame to a first position to receive and support molten glass thereon; rolling means movable on said frame and operative to roll the molten glass to provide a sheet of said glass on said rolling table; a mold movable on said frame to a first position wherein it overlies the sheet of glass with its cavity disposed toward said sheet to shield the same and maintain it in its molten state, said table and said mold being movable as a unit from their said first positions to a second position wherein said glass sheet overlies said mold cavity; power-actuated operating means for moving said rolling table and said mold to their first and second positions, said operating means being operative to return said table from its said second position to its said first position so as to leave said glass sheet extending across said mold cavity; a blow head movable on said frame from a first inoperative position to a second, operative, position wherein it rests upon said sheet; means for introducing gas under pressure into said blow head to blow said sheet into said cavity to cause it to assume the contour thereof; and control means for moving said table, said mold and said blow head in sequence.

6. An apparatus as defined in claim 5 in which said table, said mold and said blow head are pivotally mounted on said frame, said power-actuated operating means being operative to pivot said table, said mold and said blow head to their first and second positions.

7. An apparatus as defined in claim 5 in which said table and said mold are pivotally mounted on a common, horizontal, pivotal axis disposed intermediate the ends of said frame, and said blow head is pivotally mounted on a horizontal pivotal axis disposed adjacent an end of said frame, and in which said operating means is fluid actuated and operative to pivot said table, said mold and said blow head to their first and second positions.

8. An apparatus as defined in claim 5 in which said table and said mold are pivotally mounted on a common, horizontal, pivotal axis disposed intermediate the ends of said frame, and said blow head is pivotally mounted on a horizontal pivotal axis disposed adjacent an end of said frame, and in which said operating means is fluid actuated and operative to pivot said table, said mold and said blow head to their first and second positions, said operating means including rack and pinion means operative to pivot said table and said mold.

9. An apparatus as defined in claim 5 in which said rolling means is movable in a path parallel to the plane of said table when said table is in its first position, and including means for relatively adjusting said rolling means and said table toward and away from each other so as to vary the thickness of the sheet of molten glass produced by the action of said rolling means.

10. An apparatus as defined in claim 5 in which said mold is carried by a blowing table, said rolling table and said blowing table being pivotally mounted on a common, horizontal, pivotal axis disposed intermediate the ends of said frame, in which said blow head is pivotally mounted on a horizontal axis disposed adjacent an end of said frame, and in which said operating means is fluid actuated and operative to pivot said rolling table, said blowing table and said blow head to their first and second positions.

11. An apparatus as defined in claim 5 in which said mold is detachably mounted on a blowing table, said rolling table and said blowing table being pivotally mounted on a common, horizontal, pivotal axis disposed intermediate the ends of said frame, in which said blow head is pivotally mounted on a horizontal axis disposed adjacent an end of said frame, and in which said operating means is fluid actuated and operative to pivot said rolling table, said blowing table and said blow head to their first and second positions.

12. An apparatus as defined in claim 5 in which said blow head consists of a hollow dome having a perimetrical wall, the lower edge of which is tapered to adapt it to penetrate the glass sheet overlying said mold cavity so as to score said sheet outwardly of but adjacent the perimeter of said mold cavity.

13. An apparatus as defined in claim 5 in which said rolling means includes a roller rollable upon said molten glass on said rolling table so as to form a glass sheet, said roller having raised and depressed areas on its periphery so that said sheet is formed with thick and thin areas.

14. An apparatus as defined in claim 5 in which said mold is detachably mounted on a blowing table, said rolling table and said blowing table being pivotally mounted on a common, horizontal, pivotal axis disposed intermediate the ends of said frame, in which said blow head is pivotally mounted on a horizontal axis disposed adjacent an end of said frame, and in which said operating means is fluid actuated and operative to pivot said rolling table, said blowing table and said blow head to their first and second positions.

15. An apparatus as defined in claim 5 in which said mold is detachably mounted on a blowing table, said rolling table and said blowing table being pivotally mounted on a common, horizontal, pivotal axis disposed intermediate the ends of said frame, in which said blow head is pivotally mounted on a horizontal axis disposed adjacent an end of said frame, and in which said operating means is fluid actuated and operative to pivot said rolling table, said blowing table and said blow head to their first and second positions, said apparatus including pneumatic means for ejecting the molded glass article from said mold.

16. An apparatus as defined in claim 5 in which said mold is carried by a blowing table, said rolling table and said blowing table being pivotally mounted on a common, horizontal, pivotal axis disposed intermediate the ends of said frame, in which said blow head is pivotally mounted on a horizontal axis disposed adjacent an end of said frame, and in which said operating means is fluid actuated and operative to pivot said rolling table, said blowing table and said blow head to their first and second positions, said operating means including fluid cylinders, fluid lines connected to said cylinders and electrically operated valves for controlling the flow of fluid through said lines to said cylinders, and said control means including electrical circuits for said valves, contacts in said circuits, and brush means movable with respect to and adapted to successively engage said contacts so as to energize said electrical circuits in sequence.

17. An apparatus as defined in claim 5 in which said mold is carried by a blowing table, said rolling table and said blowing table being pivotally mounted on a common, horizontal, pivotal axis disposed intermediate the ends of said frame, in which said blow head is pivotally mounted on a horizontal axis disposed adjacent an end of said frame, and in which said operating means is fluid actuated and operative to pivot said rolling table, said blowing table and said blow head to their first and second positions, said operating means including fluid cylinders, fluid lines connected to said cylinders and electrically operated valves for controlling the flow of fluid through said lines to said cylinders, and said control means including electrical circuits for said valves, contacts in said circuits, pneumatically-actuated brush means movable with respect to and adapted to successively engage said contacts so as to energize said electrical circuits in sequence, and manually operable means for activating said pneumatically-actuated brush means.

18. An apparatus as defined in claim 5 in which said frame has a vertical pivotal axis at one end by which said frame can rotate in a horizontal plane, said frame having roller means at its opposite end adapted to roll along a floor during rotation of said frame.

19. Apparatus for producing hollow glass articles, including: a frame means; rolling means on said frame means for rolling molten glass to form a sheet; mold means having a cavity; means carrying said mold means into position in contact with the rolled glass sheet with the mouth of said cavity directed down toward said sheet; means for inverting said mold means and glass sheet to bring them into another position with the glass sheet at the upwardly directed mouth of said cavity, said mold means and its carrying means being swingably mounted on said frame means for movement between said positions; and blowing means for blowing said glass sheet downward into said mold cavity upon inversion of the mold means to cause the molten glass to assume the contour of said mold cavity.

20. Apparatus as in claim 19 including a swinging supporting table upon said frame means and upon which said glass sheet is rolled, said table also acting as shielding means for said sheet during inversion.

21. Apparatus as in claim 19 wherein said rolling means is provided with depressed areas to provide additional thickness of glass in said glass sheet to correspond with corners between adjacent walls of angular glass articles being formed.

22. An apparatus for producing glass articles, including: a frame; a rolling table movable on said frame to a first position to receive and support molten glass thereon; rolling means movable on said frame and operative to roll the molten glass to provide a sheet of said glass on said rolling table; a mold movable on said frame to a first position wherein it overlies the sheet of glass with its cavity disposed toward said sheet to shield the same and maintain it in its molten state, said table and said mold being movable as a unit from their said first position to a second position wherein said glass sheet overlies said mold cavity; operating means for moving said rolling table and said mold to their first and second positions, said operating means being operative to return said table from its said second position to its said first position so as to leave said glass sheet extending across said mold cavity; and means to control said operating means.

23. Apparatus as in claim 22 wherein said rolling means is provided with depressed areas to provide extra glass thickness in regions corresponding with corners of angular glass articles being formed.

24. Apparatus as in claim 22 wherein said rolling table and mold are mounted on said frame by horizontal pivot means.

25. Apparatus as in claim 22 wherein said rolling table and mold are pivotally mounted on said frame by a common horizontal pivotal axis disposed intermediate the ends of said frame.

26. Apparatus as in claim 22 wherein said frame has a vertical pivotal axis at one end by which said frame can rotate in a horizontal plane, said frame having roller means at its opposite end adapted to roll along the floor during rotation of said frame.

RALPH BROWN.

References Cited in the file of this patent

UNITED STATES PATENTS

| Number | Name | Date |
| --- | --- | --- |
| 527,476 | Bonta | Oct. 16, 1894 |
| 645,375 | Sievert | Mar. 13, 1900 |
| 694,685 | Sievert | Mar. 4, 1902 |
| 2,333,076 | Stewart | Oct. 26, 1943 |

FOREIGN PATENTS

| Number | Country | Date |
| --- | --- | --- |
| 1,233 | Great Britain | June 8, 1901 |